July 17, 1934.  M. A. BALAAM  1,966,783
PORTABLE OVERHEAD IRRIGATION PLANT
Filed March 17, 1932  5 Sheets-Sheet 1
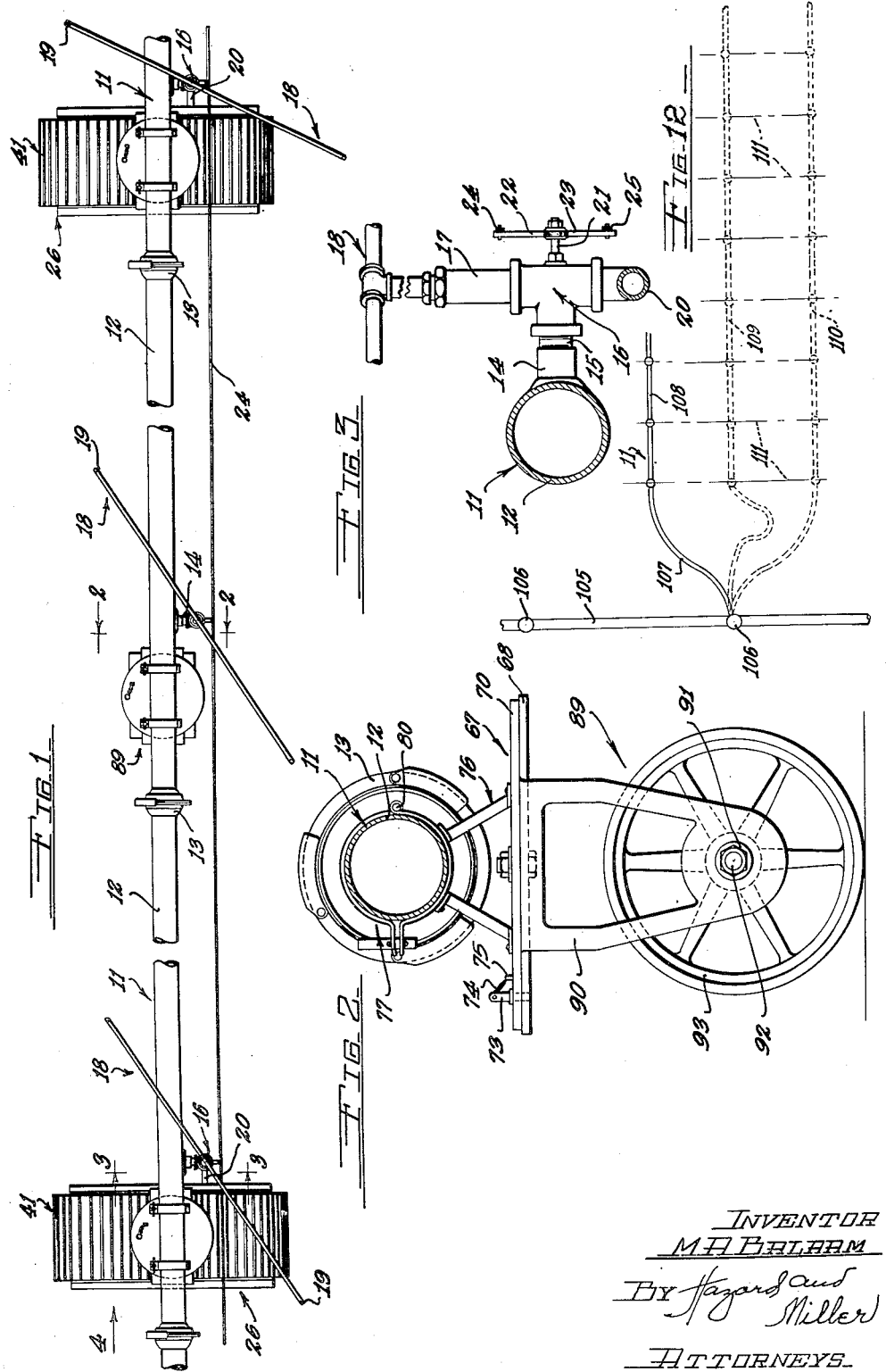
INVENTOR
M A BALAAM
By Hazard and Miller
ATTORNEYS

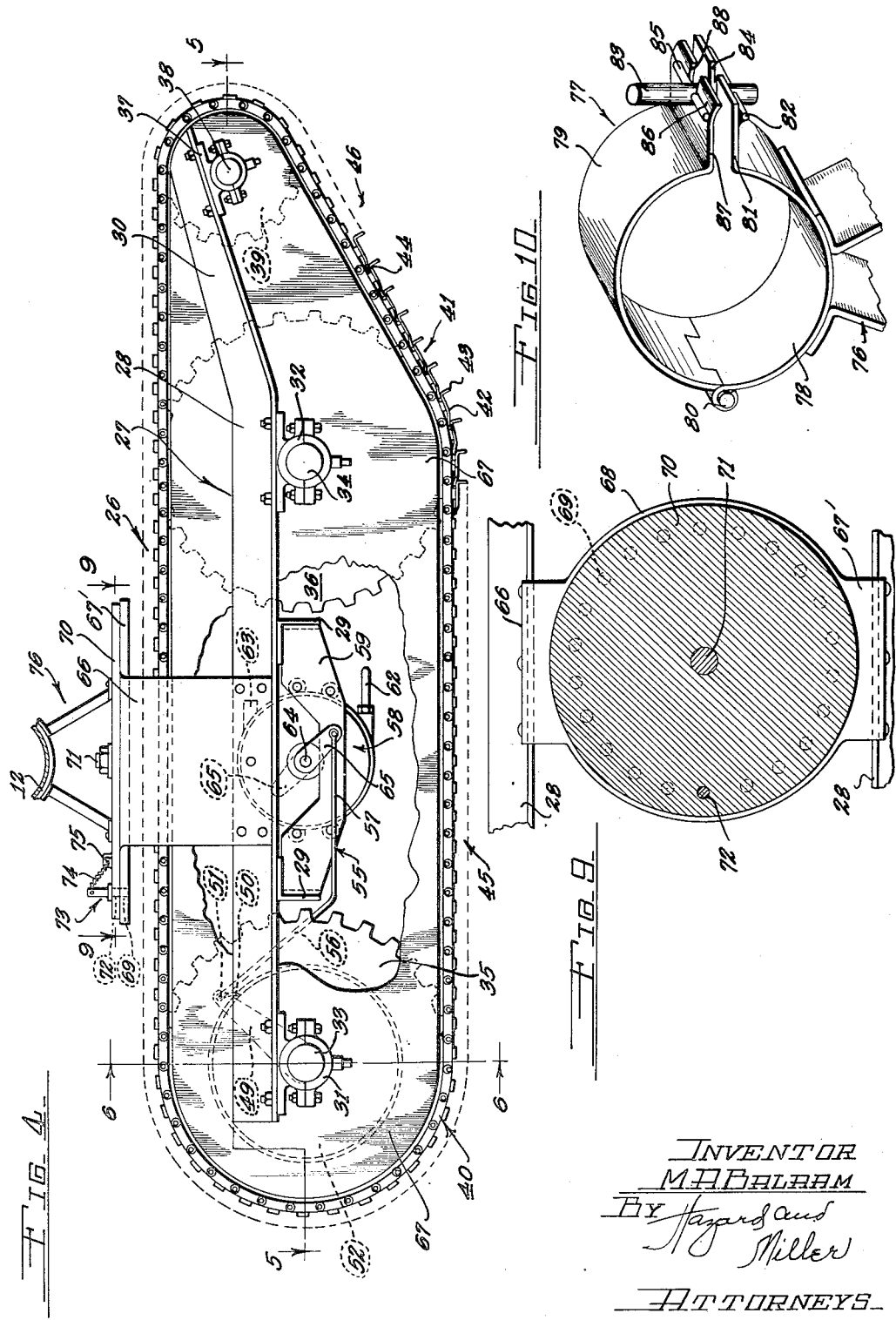

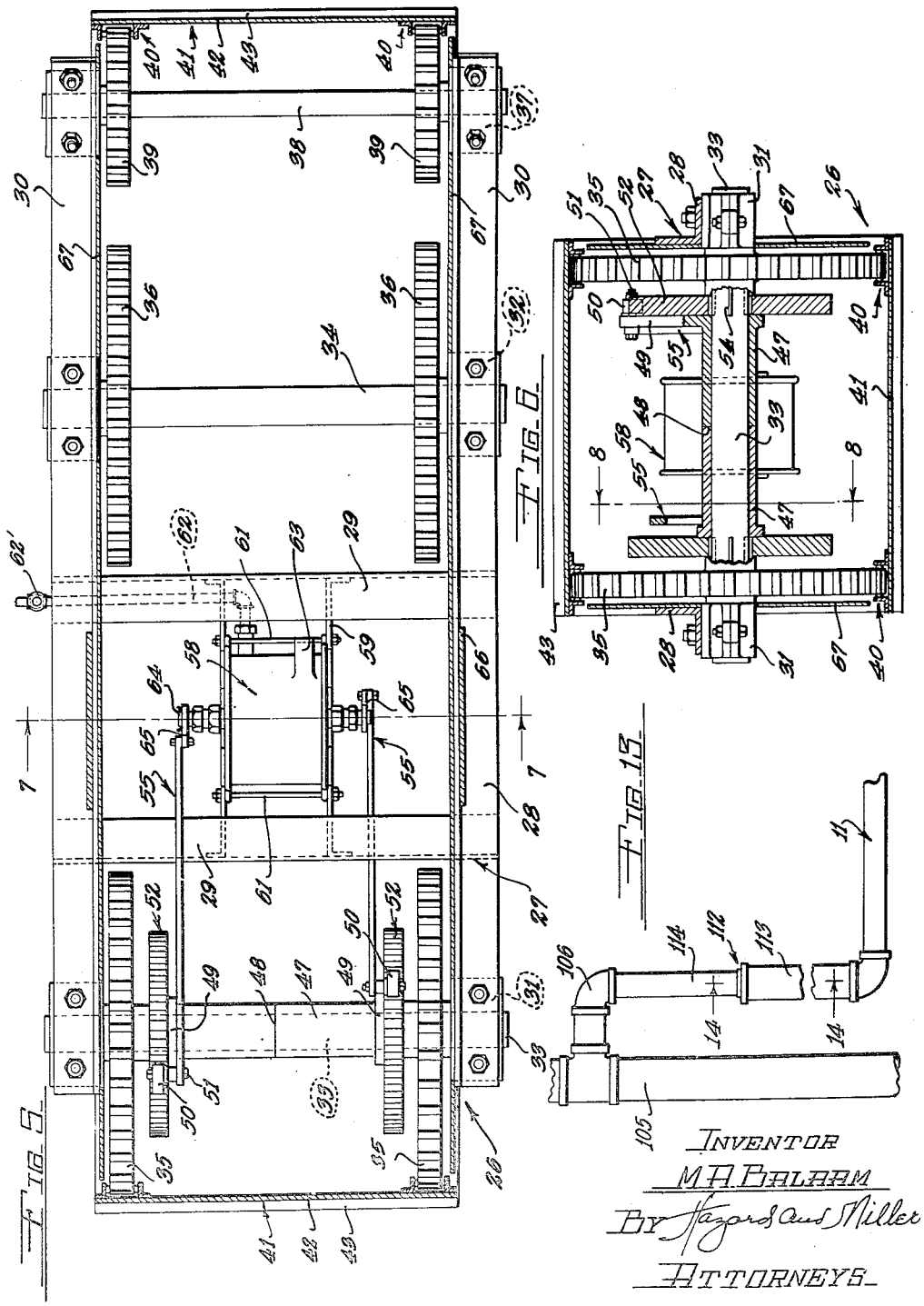

July 17, 1934.  M. A. BALAAM  1,966,783
PORTABLE OVERHEAD IRRIGATION PLANT
Filed March 17, 1932   5 Sheets-Sheet 4
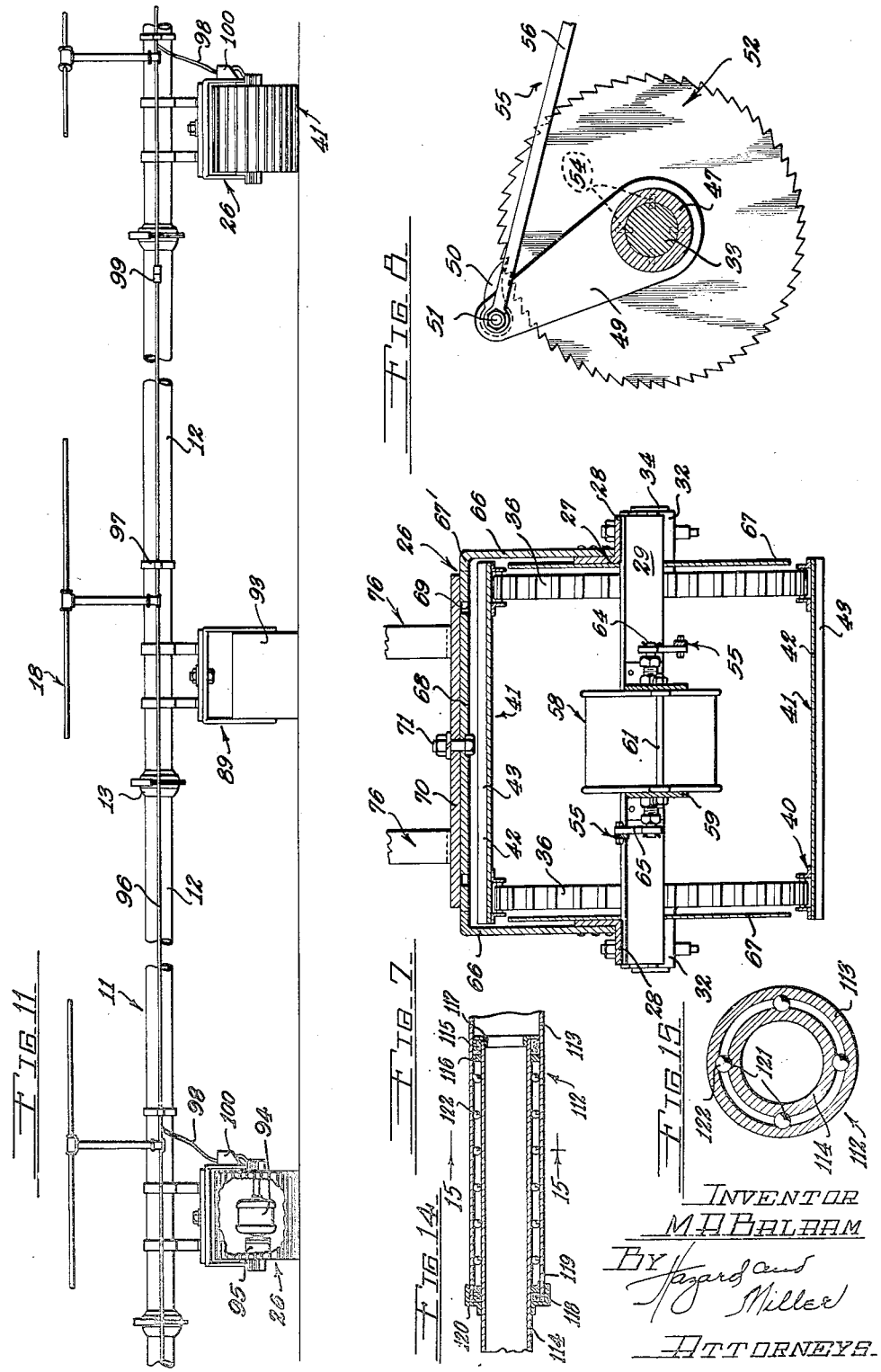

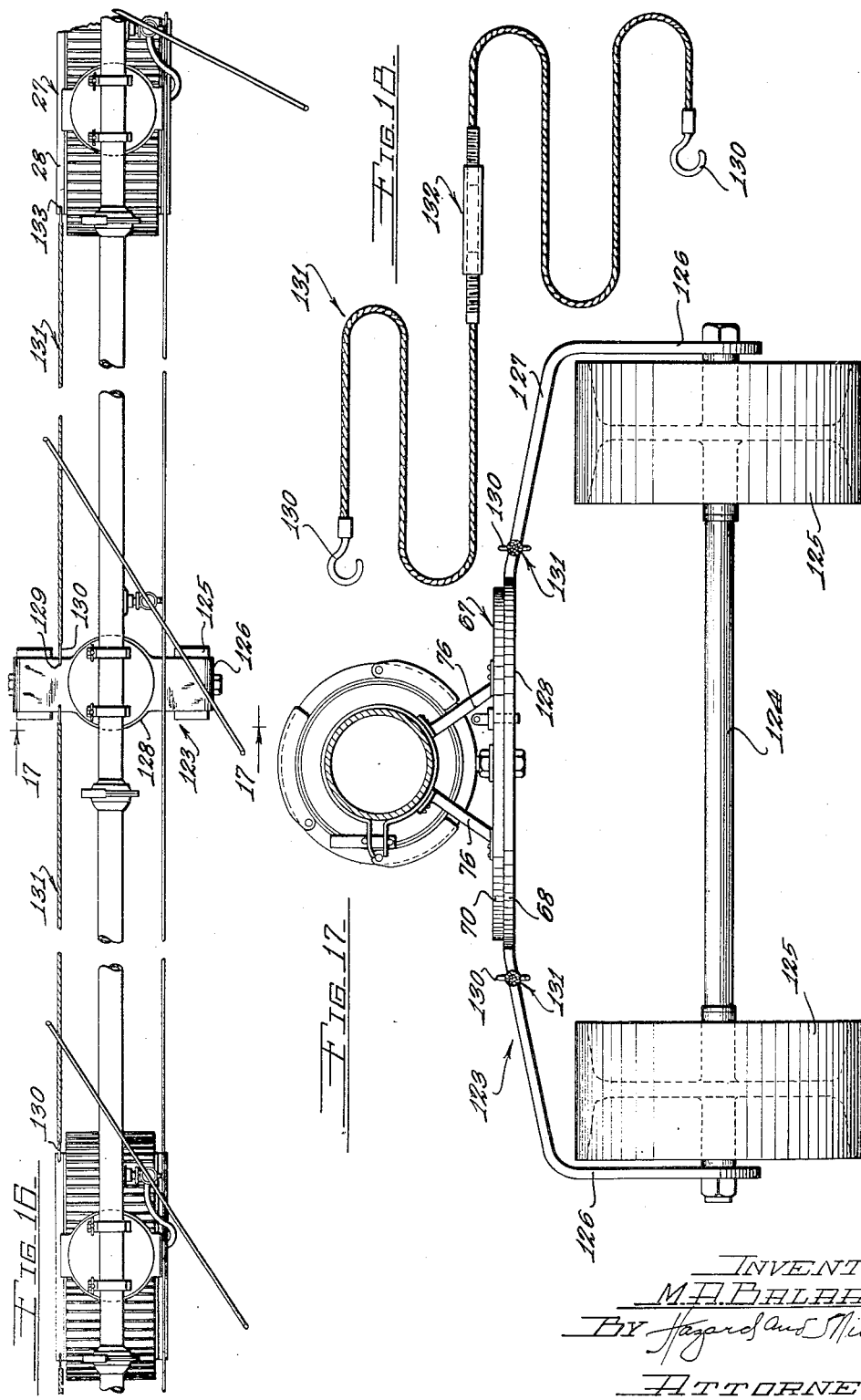

Patented July 17, 1934

1,966,783

UNITED STATES PATENT OFFICE 1,966,783

PORTABLE OVERHEAD IRRIGATION PLANT

Maurice Aaron Balaam, Lompoc, Calif., assignor of one-half to Rain Machine, Ltd., Lompoc, Calif., a corporation of California, and one-half to West Coast Pipe & Steel Co., Los Angeles, Calif., a corporation of California Application March 17, 1932, Serial No. 599,486

11 Claims. (Cl. 299—49)

My invention relates to an overhead irrigation plant in which pipes having universal or so-called flexible joints for carrying water extend across the surface of fields or tracts of land to be irrigated and in which stand pipes having sprinklers are connected at different intervals to the supply pipe. In this type of irrigation the water is supplied under pressure and causes the operation of the sprinklers, which are usually of a rotating type, giving a spread to the discharged water.

With this type of irrigation it has been customary to disconnect the pipes at the joints and for men to carry the pipe sections from one location to another, again connecting the pipes and supplying the water under pressure for a different area to be irrigated. This is of the so-called rain or overhead sprinkler type, and it has been necessary to irrigate an area extending longitudinally of the supply pipe with the spread on opposite sides of such pipe and then to move the pipe by individual sections laterally to a new area which is to be irrigated. This procedure has in the past been carried on until the whole area is irrigated.

The main object and feature of my invention is a portable irrigation plant in which the supply pipe, instead of being disconnected at the joints for moving from one area to another, is bodily shifted either directly laterally of the pipe or at any desirable angle thereto. The water may be turned off of the irrigation sprinkler system while the device is being moved. Thus, the supply pipe with the stand pipes and sprinklers is bodily conveyed from one locality to another. This arrangement eliminates the disconnection of the joints of the supply pipe and again connecting these at the new area to be irrigated.

Another object and feature of my invention is mounting the pipe on carriages or truck-like structures so that when these carriages are moved from one area to another the pipe with the stand pipes is bodily moved. On account of the flexibility of the pipe, such pipe having universal or flexible joints, any slopes within the angle of the turn of the pipes may be covered by the irrigation system, and also, irregularities of the ground surface are overcome by the carriages moving over these and the flexible pipes forming a connection from one carriage to another.

Another object and feature of my invention is to provide a series of these carriages which may be propelled, each carriage having a pipe section clamped thereto. In addition, I provide a control for the power to operate each carriage so that the carriages may simultaneously move at the same speed and in the same direction.

A further detailed object and feature of my invention in one type is to operate the carriages by water through the supply pipe, each carriage being provided with a hydraulic motor, the supply being diverted from the sprinklers or sprayers to the hydraulic engine.

As a detailed feature of my invention I arrange valves positioned adjacent each engine and connected with the adjacent stand pipe. All of these valves may be controlled from one end of the supply pipe simultaneously so that the spray water is turned off and the water is turned into the hydraulic engines, thus operating all of the engines simultaneously.

Another object and feature of my invention includes a swivel connection of the individual driving carriages to the supply pipe so that these carriages may be turned at different degrees of angularity to the pipe, that is, they may be arranged directly transverse to the pipe, that is, at right angles thereto or turned in an axial direction of the pipe or at any intermediate angles, and all of the carriages may be set and locked at the desired angle in reference to the pipe. By this construction the supply pipe may be moved directly in a longitudinal direction of the axis of the pipe or may be moved bodily at right angles to the axial direction of the pipe, or the pipe may be advanced diagonally across the field.

Another feature of my invention relates to a construction by which the controlling speed of the individual engines may be changed whereby certain of the carriages may be driven at a higher speed than the others. This factor may be used to swing the pipe bodily in an arc of a circle, one end of the pipe forming the center of such arc.

Another detail of the portable irrigation plant is the provision of non-driven dollies or supporting carriers which support the pipe intermediate the driving carriages. This lessens the number of driving carriages required as the dollies may support the pipe at intermediate sections of the pipe and such dollies are pulled across the ground by the power driven carriages. With this arrangement the pipes are usually made in definite lengths and, for instance, the driving carriages may be connected at every alternate length with a non-driven dolly in between.

In the arrangement for driving the engines of the power carriages from a fluid supply through the supply pipe, I provide three-way valves connecting from the supply pipe to the stand pipes having the sprinklers and such valves also connecting to the engines of such carriage. These three-way valves all have operating arms with a pair of connecting cables, the pull on one cable turning the valve to lead the water to the stand pipes and to shut off the supply to the engines, pulling on the second cable reversing the valve, that is, shutting off the irrigation water to the sprayers and opening the supply to the engines on the carriers. A similar type of valve is suitable for using compressed air or steam as a source of power.

Another detailed feature of my invention relates to the mounting attachment of the pipes on the carriers and the dollies, this being by means of a turn table, which table may turn on a vertical axis and thus the supply pipe may be positioned at different angles in reference to the individual carriages or dollies, each turn table having means for clamping or locking in the desired degree of angularity in reference to the line of supply pipes.

Another object and feature of my invention relates to the manner of connecting the irrigation plant with a main supply pipe or supply ditch. As the supply pipe is usually provided with a plurality of outlets which may be used in succession as the irrigation plant is moved over a field, I supply a flexible connection from the supply pipe to the irrigating pipe line. This may be a large flexible hose or by telescoping connection pipes.

My invention is illustrated in connection with the accompanying drawings, in which:

Fig. 1 is a plan of a section of an irrigation plant.

Fig. 2 is a vertical section on the line 2—2 of Fig. 1 in the direction of the arrows, illustrating one of the dollies for non-driven carriages.

Fig. 3 is a vertical section on the line 3—3 of Fig. 1 in the direction of the arrows, illustrating the mounting of the three-way valve for supplying the sprinklers and the power to the motor.

Fig. 4 is a side elevation partly broken away of one of the self-propelled carriages on an enlarged scale as if taken in the direction of the arrow 4 of Fig. 1.

Fig. 5 is a horizontal section on the irregular line 5—5 of Fig. 4 in the direction of the arrows to illustrate mainly the driving mechanism for the carriage.

Fig. 6 is a vertical detailed section on the line 6—6 of Fig. 4 in the direction of the arrows.

Fig. 7 is a vertical section on the line 7—7 of Fig. 5 in the direction of the arrows, showing the motor, however, in elevation.

Fig. 8 is a vertical detailed section on the line 8—8 of Fig. 6 in the direction of the arrows, to illustrate a ratchet drive of the fluid motor.

Fig. 9 is a horizontal section on the line 9—9 of Fig. 4 to illustrate the turn table.

Fig. 10 is a perspective view of one of the pipe clamps.

Fig. 11 is an elevation of a section of another type of irrigation plant showing an electric motor drive for the self-propelled carriages and the support for the power line.

Fig. 12 is a diagram showing a manner of connection of the irrigating plant to a supply pipe.

Fig. 13 is a diagram showing a connection of the irrigating plant line to a supply pipe using a telescopic connection.

Fig. 14 is a longitudinal section taken on the line 14—14 of Fig. 13 in the direction of the arrows.

Fig. 15 is a transverse section on the line 15—15 of Fig. 14 in the direction of the arrows.

Fig. 16 is a plan view of a modification of my invention with the dollies of a wide wheel base.

Fig. 17 is a vertical, transverse section on the line 17—17 of Fig. 16 in the direction of the arrows.

Fig. 18 is a diagram of an adjustable connecting cable.

In the general aspects of my invention I utilize a line of supply pipe 11 which has flat pipe sections 12, these having universal couplings or flexible joints 13. The type of joint is not illustrated herein but may be made in accordance with that shown in a patent application by John Alfred Lambie for Flexible irrigation pipe coupling, Ser. No. 584,822, filed January 5, 1932, although it is manifest that other types of universal or flexible joints may be used. The sprinkling or spray system employs a connection 14 with a nipple 15 connected to a combination T and three-way valve 16. Stand pipes 17 extend upwardly from the T pipe and on the top of such stand pipes there are rotary spray pipes 18 having discharge nozzles 19. Extending downwardly from the three-way valve there is a feed pipe 20 for supplying the fluid engine hereinunder detailed. Each three-way valve is provided with a valve stem 21 having an upper and a lower operating arm 22 and 23, to each of which there is connected a longitudinal cable 24 and 25, these cables being for the purpose and operated as hereinunder detailed. Certain of the pipe sections are carried and mounted in a manner hereinunder specifically detailed on power driven carriages designated generally by the assembly number 26.

These carriages are constructed as follows, being illustrated particularly in Figs. 4, 5, 6, 7, and 8. A horizontal frame 27 is formed of longitudinal rails 28 and cross bars 29. The rails have an up turned end portion 30 at the front end. Journal boxes 31 and 32 are secured to the opposite side rails and in the journal boxes 31 there is rotatably mounted a drive shaft 33. The journal boxes 32 carry a non-driven shaft 34. The shaft 33 has a pair of sprocket wheels 35 and the shaft 34 a pair of sprocket wheels 36. There are a pair of journal boxes 37 at the forward end of the frame and these carry an idler shaft 38 on which there are a pair of sprocket wheels 39. A pair of endless chains 40 operate over these sprocket wheels and the chains have slats 41 connecting between each chain. These slats are formed with a tread portion 42 and a fin or fin blade or grouser portion 43 to bed in the ground surface. It will be noted that the tread surface is slightly bent to allow a slight overlap indicated at 44 in the slats. Lower run 45 of the endless belt formed of the chains and slots runs on a level ground surface and the sloping front end 46 is designed to lead the carriage over sudden humps in the ground or to help pull the carriage out of depressions it might tilt into.

The drive mechanism comprises a pair of sleeves 47 on the shaft 33, these meeting at the center 48. An arm 49 is rigidly connected to each sleeve. A pawl 50 is pivotally mounted on each arm on a pintle pin 51 and these pawls engage each a ratchet wheel or gear 52, these being illustrated as secured to the drive shaft 33 by keys 54 or the like.

The arms are pivotally connected to pull links 55, these being illustrated as having an upwardly bent section 56 and a horizontal section 57. The pintle pin 51 forms a connection of the links to the arm 49.

A fluid motor designated generally at 58 is preferably of a known type of water or air or steam driven motor. I prefer, however, to use a water motor and this is suspended or mounted on longitudinal flat bars 59 connecting between the transverse bars 29 of the frame of the carriage. Tie bolts 61 securely clamp the motor in position. A flexible feed pipe 62 connects to the feed pipe 20 from the three-way valve in any suitable manner and the motor is illustrated as having a discharge or waste pipe 63. The type of motor which I prefer to use is of an oscillating type and has a power shaft 64 to which are connected two arms 65, each of which is pivotally connected to one of the links 55. Therefore, when water under pressure, compressed air, or steam, is supplied through the feed pipe, the motor oscillates. This causes an oscillation of the arm 65 and reciprocation of the links 55. A pawl and ratchet then alternately engage the ratchet wheels 52 and pull these in a forward direction, the pawl returning idly. Thus there is a drive first through one ratchet wheel to the drive shaft 33 and then through the other. By this means a substantially continuous power drive is communicated from the oscillating motor, through the shaft 33, to the drive sprocket gears 35, and from thence to the chains and the endless belt for moving the carriage in a forward direction.

In order that the supply of liquid, air, or steam to the engines of the carriages may be individually controlled, I provide a separate valve 62' on each of the feed pipes for the engines. Therefore, if, for any reason, one engine would tend to move faster or slower than the others the supply of fluid power may be varied. Also, when it is desired to have the line of pipe turn in an arcuate or wheeling movement, each individual valve 62' may be regulated to govern the speed of the engine of its carriage accordingly.

The mounting of the pipes on the carriage comprises side plates 66 which are secured to the side rails 28 and extend upwardly outside of the protected cover plates 67. Such cover plates are located above and below the rails 28 and form a protective side cover. A platform 67' connects the two side plates. This platform is provided with a circular section 68 having a series of perforations 69, and on this platform there is mounted a turn table 70, this also being circular, there being a central pivot bolt 71 clamping the turn table to the circular portion of the platform 67. The turn table is provided with a single perforation 72 which may be aligned with any of the perforations 69, and a pin 73 inserted therethrough to hold the turn table at any relative angle on the platform. This pin is illustrated as having a retaining chain 74 connected to an eye 75 on the turn table, thus preventing loss of such pin. The turn table is provided with two pairs of legs 76, each set being connected to a clamp 77 (note Fig. 10). These clamps are provided with a semi-cylindrical lower jaw 78 rigidly connected to the upper end of the legs, and to this jaw there is pivotally mounted a jaw 79 having a connecting pintle 80. The lower jaw has a radial flange 81 with a pintle pin 82 secured thereto. On this pintle pin swings a latch bar 83, this operating through a radial slot 84. The latch bar has a clamping pin 85 which is adapted to engage the upper convexly curved surface 86 of a radial flange 87 of the upper jaw 79. The latch bar 83 operates in the radial slot 88 in this upper flange. The two clamps on the top of each turn table thus clamp the pipe rigidly in two places spaced apart. The universal or flexible joint is located at one side of the carriage so that the pipe section supported by a carriage may be considered as rigidly connected to such carriage except for the swiveling connection on the vertical pivot pin 71.

The non-driven dolly construction 89, illustrated particularly in Fig. 2, utilizes a side frame 90 which is connected to a platform similar to the platform 67, such platform having a circular section and having a turn table thereon similar to the turn table 70. These side frames have axle journals 91 in which is mounted a fixed axle 92, such axle carrying a supporting wheel 93. The dollies are provided with clamps for clamping the pipe similar to those on the power driven carriages.

In Fig. 11 I have illustrated a modified construction in that the power driven carriages are electrically operated. These are illustrated as having electric motors 94 which move a gear drive connection 95 to, preferably, the axle 33 of the carriages, this being a geared down transmission. An electric power line 96 is suspended on the line of supply pipes by means of insulating supports 97. Branch feed wires 98 lead to the electric motors. Disconnectible electric couplings 99 are utilized adjacent the universal joints of pipe to connect the individual sections of the electric power line. On one of the side plates of each carriage there is an electrical control device 100, by which the current supply to each individual motor may be regulated independently of the others. With this construction a main control switch preferably having a controller and control rheostats is located at one end of the water supply pipe so that power may be applied to the motors of all of the carriages at the same time. It is obvious by this construction that the electric supply lines, the branch lines, and all of the connections must be well insulated from the water of the irrigation sprinkling system and the electric motors must also be well insulated from water. The feed cable and the supply lines are preferably provided with two conductors forming a feed and return power line. With this construction it is obvious that while it would probably be desirable to turn off the water while the device is being moved across a field, nevertheless, the pipe line could be advanced slowly in a manner transverse or at an angle to the line of pipe and the water spray could be maintained while it is under slow movement.

While in the illustrations I have shown and indicated a suitable type of flexible joint or coupling between the pipe sections, it is manifest that other types of flexible connections may be utilized. It is to be also understood that the individual pipe sections may be made of varying lengths and the irrigating pipe line designed for the particular field or tract of land which is to be irrigated in which on level stretches the pipe sections could be of considerable length and on rough or rolling ground they could be made comparatively short to allow greater flexibility to accommodate the pipe line to the contour of the ground surface.

Another feature of my invention relates to the manner of connecting the irrigating plant line with a supply pipe or an irrigating ditch. In Fig. 12 I show the general scheme in which the supply pipe is designated by 105. This has a plurality of outlets 106 of the usual character, and there is a connection to the pipe line 11 by flexible connection 107. In Fig. 12 this connection is illustrated by means of a flexible hose of suitable diameter, such as reinforced rubber hose. In this illustration one position of the pipe line for irrigation is indicated at 108. The line is then bodily removed to another position indicated as dotted 109, and to still another position 110. The individual carriages are indicated as following the lines 111, this being a case in which the irrigating pipe line is moved at substantially right angles to its longitudinal direction.

In Fig. 13 the supply line is illustrated as having telescopic connection sections 112 with the irrigating line 11. The details of this connection are shown in Figs. 14 and 15 in which the telescopic section has an outer pipe or sleeve 113 in which fits and operates the inner pipe 114. A water tight packing 115 is secured at the inner end of the section 114. This packing is illustrated as held in place by a collar 116 secured to the pipe 114 and a second collar 117 also secured to the same pipe. At the outer end of the large section 113 there is a packing 118. This is held in place on the inside by a packing ring 119 secured to the inside of the pipe 113 and by a screw threaded gland 120. This construction, using the two packings, forms water tight joints at the telescopic sections. In order that these sections may slide and telescope freely, I provide the inner and outer pipes 114 and 115 with ball races 121 in which operate balls 122. These balls operate with the packing in holding the pipes concentric.

It is obvious that where an irrigation ditch is used that a portable pumping plant may be located at the ditch, and flexible or telescopic connections taken from the pumping plant to the pipe line 11.

In some places while using my invention it is desirable to either use the water power for moving a pipe lengthwise or by towing the carriages supporting the pipe, in which case as the self-propelled carriages having the endless belt are rather narrow, these are apt to upset. In cases like this I use dollies which have a wide wheel base, the two wheels being sufficiently wide apart to prevent overturn of the string of irrigation pipe. Such a construction is illustrated in Figs. 16 and 17. The dolly of this construction, designated 123, is illustrated as having a long axle 124 with wide-tired wheels 125 on opposite ends. Side frames 126 extend upwardly from the axle and these are connected to a platform 127 which has a circular center section 128, which center section is substantially the same as the circular section 68 of the single wheel dollies or self-propelled carriages. The turn table 70 is mounted on top of the circular section 128, being secured in the same manner as prior constructions, and a pair of legs 76 extend upwardly from the turn table and support the pipe sections.

The platform 127 at each side of the circular section has eyes 129 in which the hooks 130 of flexible cables 131 connect. Such cables have an adjusting turn buckle 132. When such cables are used the longitudinal rails 28 of the side frames 27 of the self-propelled carriages are also provided with eyes 133 at each end. The cables may thus be connected between the eyes of the carriages and the dollies on each side. This allows towing of a string of irrigation pipe without the self-propulsion of the carriages. The water is let out of the pipes for moving them in this manner, and by this construction the line of irrigation pipes may be towed or pulled by cables between the rows of trees in an orchard. The irrigation pipe may then be connected to a supply line and one section of the orchard irrigated. If the orchard has rows of trees of great length, one length of irrigation pipe may irrigate half the length of a pair of rows of trees and then be pulled lengthwise to continue irrigating the same row. The string of pipe may then be pulled by a tractor or by cables using winches to another position in parallel rows. On account of the flexibility of the pipe couplings turns may be made around trees so as to move the irrigation pipe from one row to another.

It will be apparent that in ordinary field irrigation the dolly of Fig. 17 having the two spaced-apart wheels may be substituted for the single wheel dolly, particularly if the ground is rough, and the pipes are to be moved lengthwise, as this prevents their upsetting.

In some cases the cables 131 may be dispensed with and the pipe with the dollies moved lengthwise by pulling on the end of the pipe. In fact, I have found that a series of dollies, such as illustrated in Fig. 7, may be used to support the pipe. The turn table and the dollies should be clamped firmly and the pipes clamped to the turn table. Then, on account of the flexible joint of the pipes being positioned from each of these dollies, the lateral swing of the trailing end of the pipe, when the pipe with the dollies is pulled lengthwise and in a curved path, causes the succeeding dollies to follow in substantially the path of the leading dollies and carriages. This construction allows the irrigating equipment to be readily pulled around in open fields or in orchards as the joint of the flexible pipe allows a turn quite an appreciable angle before the adjacent pipes bind with the coupling.

Various changes may be made in the details of construction without departing from the spirit or scope of the invention as defined by the appended claims.

I claim:

1. An irrigation plant having a line of water pipes formed of individual pipes with flexible joints or couplings, sprinklers connected to certain of said individual pipes, a plurality of carriages having means for rolling over the ground surface with a supporting and clamping connection between each carriage and an individual pipe, certain of said carriages having fluid operated engines connected to propel such carriages, power fluid connections to the engines, a valve having a connection from individual pipe sections to the individual sprinklers and to the individual power fluid connections, and means to control said valves to distribute water through the sprinklers or through the power fluid connections to the engines.

2. An irrigation plant as claimed in claim 1, the means to control the valves comprising operating devices extending longitudinally of the line of water pipes and operative from one end of such pipes to actuate all of said valves simultaneously.

3. An irrigation plant as claimed in claim 1, said valves being of a three-way type and each having upper and lower operating arms with a pair of operating cables, one cable being connected to the upper arms and the other to the lower arms, said cables extending longitudinally of the line of water pipes, whereby pulling on one set of cables actuates all of the valves simultaneously in one direction and pulling on the other cable actuates said valves in another direction.

4. A portable irrigation plant comprising, in combination, a plurality of lengths of rigid irrigation pipe, a carriage for each length having a platform and a turn table thereon rotatable on a vertical pivot, clamps securing each length of pipe to a turn table, means to adjust the angularity of the turn table and each length of pipe to the platform, a joint connecting adjacent lengths of pipe, each joint being constructed to transmit pulling stresses, and a connection from one end of the length of pipe to a source of fluid, certain of the carriages having engines, a ground engaging means driven by each engine, a fluid connection from the pipe carried by the carriage having the engine to the engine, a valve at each fluid connection, and a cable extending longitudinally of the length of pipe to control the valves simultaneously.

5. In a portable irrigation plant, a plurality of carriages, a line of irrigation pipe mounted on said carriages, sprinklers on the pipe, a hydraulic engine in the carriages and having means to operate same, a liquid connection from the pipe to each engine and from the pipe to each sprayer, and an operating means extending lengthwise of the irrigation pipe and operated from one end to simultaneously shut off the liquid supply to the sprinklers and connect such supply to the engines, or vice versa.

6. In a portable irrigation plant, a plurality of carriages, a length of irrigating pipe extending along such carriages and having a mounting on each carriage, each carriage having a hydraulic engine, a sprinkler connected to the pipe adjacent each carriage, a common valve for the engine of each carriage and the sprinkler adjacent thereto, and means to operate the valves simultaneously for shutting off the fluid supply to each sprinkler and opening the fluid supply to each adjacent engine, or vice versa.

7. In a portable irrigation plant as claimed in claim 6, the means to operate each valve comprising a cable connected to each valve and extending longitudinally of the line of irrigation pipe whereby said cable may be operated from one end of the pipe and actuate all of the valves simultaneously.

8. An irrigation plant having a line of water pipes formed of individual pipes with flexible joints or couplings, sprinklers connected to certain of said individual pipes, a plurality of carriages having means for rolling over the ground surface with a supporting and clamping connection between each carriage and an individual pipe, certain of the carriages having fluid operated engines connected to propel such carriages, and power fluid connections to the line of pipes, means to control the fluid supply to the sprinklers and the power supply to the engines comprising valves controlling the water to the sprinklers, and the power fluid to the engines, and an operating means extending longitudinally of the line of pipes and operated from one end to simultaneously turn the water off or on to the sprinklers, and the supply fluid on or off to the engines.

9. A portable irrigation plant comprising, in combination, a plurality of lengths of irrigation pipe, carriages each having a turn table thereon with a length of pipe clamped to each turn table, a coupling connecting adjacent lengths of pipe, means to connect one pipe to a source of fluid, certain of the carriages having engines, a ground engaging means driven by each engine, a fluid connection from the pipes to each engine, a valve in each connection, and a common means to control all of the valves simultaneously.

10. A portable irrigation plant comprising, in combination, a plurality of carriages each having a length of irrigation pipe mounted thereon, a connection between adjacent pipes, a valve for each carriage, an engine connected to each valve and driving a carriage, a sprayer connected to each valve, and means extending longitudinally of the pipe to operate all of the valves simultaneously to supply water to the engines and to shut off the water to the sprayers or to supply water to the sprayers and shut off the water to the engines.

11. A portable irrigation plant as claimed in claim 10, the means extending longitudinally of the pipe comprising a pair of cables connected to the valves extending longitudinally of the pipe.

MAURICE AARON BALAAM.